United States Patent [19]

Waser et al.

[11] Patent Number: 4,789,317

[45] Date of Patent: Dec. 6, 1988

[54] ROTARY VANE OIL PUMP AND METHOD OF OPERATING

[75] Inventors: Max P. Waser, Bauma, Switzerland; Thomas M. Zinsmeyer, Pennellville, N.Y.

[73] Assignee: Carrier Corporation, Syracuse, N.Y.

[21] Appl. No.: 41,576

[22] Filed: Apr. 23, 1987

[51] Int. Cl.$^4$ .............................................. F04C 2/00
[52] U.S. Cl. .................................... 418/189; 418/259
[58] Field of Search ................. 418/180, 189, 259–269

[56] References Cited

U.S. PATENT DOCUMENTS

| | | | |
|---|---|---|---|
| 888,779 | 5/1908 | Berrenberg | 418/259 X |
| 1,558,639 | 10/1925 | Schmied | 418/180 X |
| 2,216,053 | 9/1940 | Staley | 418/268 |
| 3,150,646 | 9/1964 | Bernard | 418/259 X |
| 4,261,184 | 4/1981 | Stout | 418/259 X |
| 4,284,392 | 8/1981 | Pareja | 418/259 X |
| 4,536,141 | 8/1985 | Maruyama | 418/259 X |
| 4,702,684 | 10/1987 | Takao et al. | 418/259 |

Primary Examiner—Carlton R. Croyle
Assistant Examiner—Ted Olds
Attorney, Agent, or Firm—David J. Zobkiw

[57] ABSTRACT

A rotary vane pump has restricted fluid communication between the inlet and the trapped volume for about 4° of rotation beyond when the vane starts past the inlet. Similarly there is restricted communication between the trapped volume and the outlet for about 4° of rotation prior to the vane reaching the outlet. Additionally, in the preferred embodiment, the trapped volume is in restricted communication with the outlet prior to its isolation from the inlet.

10 Claims, 3 Drawing Sheets

ROTARY VANE OIL PUMP AND METHOD OF OPERATING

BACKGROUND OF THE INVENTION

The oil pump, oil filter and oil cooler of a hermetic centrifugal chiller can make up a package. The oil is pumped through the filter and cooler to remove foreign particles and excess heat, respectively. A portion of the lubrication oil can be used to position the diffuser wall. Oil flow is directed to the compressor motor end bearing. The remaining oil flow lubricates the compressor transmission, journal and thrust bearings. Oil then drains into the oil reservoir to complete the cycle.

Various types of pumps may be used for circulating the oil depending upon the specific use in view of the suction head, steady state and transient conditions, noise, pressure pulsations, etc. of the specific use. Because refrigerant is in the oil, with the maximum amount being present at startup, the transient conditions of outgasing and foaming can occur in response to the suction pressure drop. In the case of a rotary vane pump the overall performance is good but it is noisy and has pressure pulsations. The pulsations occur at the vane passing frequency which is equal to the number of vanes times the running speed. Pressure pulsations are related to the swept volume per stroke.

SUMMARY OF THE INVENTION

The high noise level of a rotary vane pump is primarily due to the sudden transition from the suction to the discharge stroke. Each time a vane passes the trailing edge of the suction port it induces a shock. The present invention seeks to alleviate the shock by smoothing the transition between suction and discharge. Tapered chamfers have been formed so that the suction side closes gradually against the discharge side, over a finite amount of time. In fact, the chamfers may even provide a restricted instantaneous communication between the inlet and outlet.

It is an object of this invention to reduce the noise of a rotary vane device.

It is another object of this invention to reduce the pressure pulsations in a rotary vane device.

It is an additional object of this invention to provide a gradual transition from suction to discharge in a rotary vane device.

It is a further object of this invention to provide a restricted communication between the inlet and outlet through the trapped volume at the time of transition from suction to discharge. These objects, and others as will become apparent hereinafter, are accomplished by the present invention.

Basically, in the preferred embodiment, a tapered chamfer is provided at the inlet and outlet of a rotary vane device so that the suction ends gradually and the discharge starts gradually. Additionally, the chamfers provide restricted communication between the inlet and outlet through the trapped volume at the time of transition from suction to discharge.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
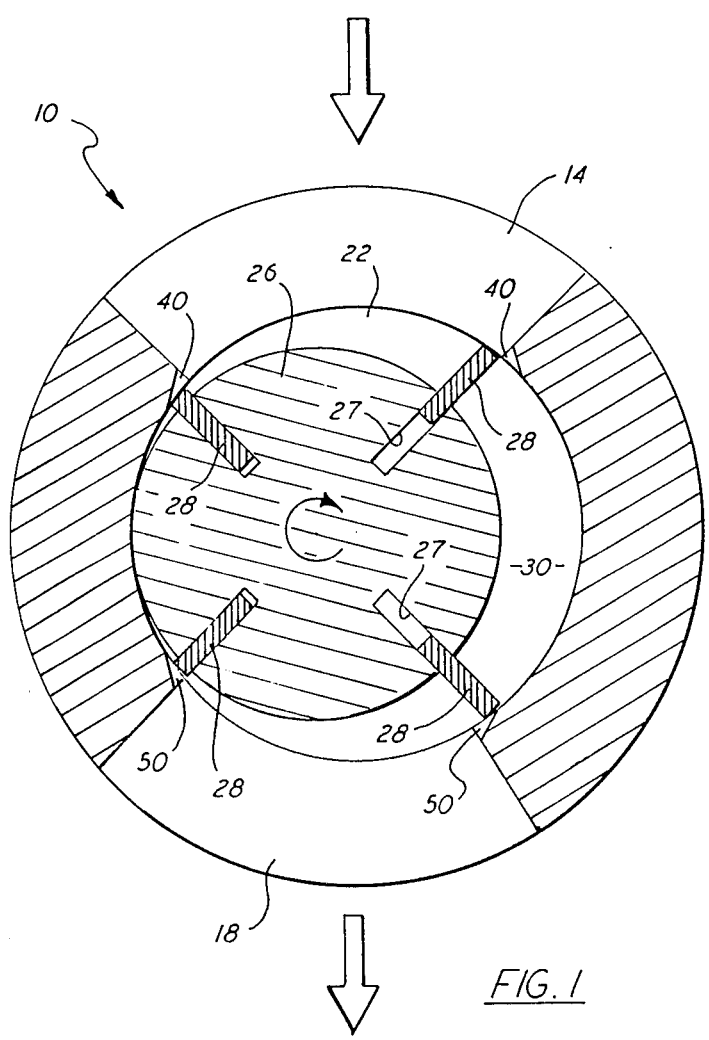
FIG. 1 is a sectional view of a rotary vane pump made according to the teachings of the present invention.

In FIG. 1, the numeral 10 generally designates a rotary vane pump having an inlet defined by opening 14 and an outlet defined by opening 18 which are fluidly connected to cylindrical chamber 22. However, chamber 22 can be elliptical also. Cylindrical rotor 26 is located in chamber 22 such that it rotates about a fixed axis which is eccentric with respect to the axis of the chamber 22 such that the cylindrical rotor 26 is essentially tangent to the wall of chamber 22 at one fixed location. Four radial slots 27 are formed in rotor 26 and spaced 90° apart. Vanes 28 are located in each of the slots 27. As illustrated, vanes 28 are in contact with the wall of chamber 22 by centrifugal force when rotor 26 is rotated. However, if necessary, or desirable, vanes 28 can be spring biased into contact with the wall of chamber 22. From FIG. 1, it is readily apparent that only one trapped volume pumping chamber 30 defined by rotor 26, adjacent vanes 28 and the wall of chamber 22 exists at any one time and that the pumping chamber 30 is of a circumferential extent essentially equal to the circumferential distance between inlet 14 and outlet 18. The structure so far defined is conventional and results in a sharp cutoff in communication between the inlet 14 and chamber 30 immediately followed by an establishing of communication between chamber 30 and outlet 18 which is the source of the noise and pressure pulsations in the prior art device.

Pump 10 differs from the prior art devices by the provision of identical, or similar, chamfers 40 at the transition of inlet 14 to cylindrical chamber 22 and chamfers 50 at the transition of cylindrical chamber 22 to outlet 18. As illustrated in FIG. 1, there is a position of rotor 26 in which vanes 28 coact with chamfers 40 and 50 to provide a restricted but continuous communication between the inlet 14 and outlet 18 via chamber 30 at the time of transition from suction to discharge. This helps to smooth the pressure pulsations.

Figure 2:
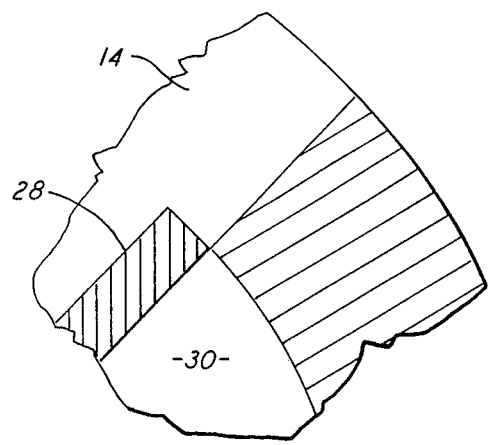
FIG. 2 is a sectional view showing the PRIOR ART inlet.
Figure 3:
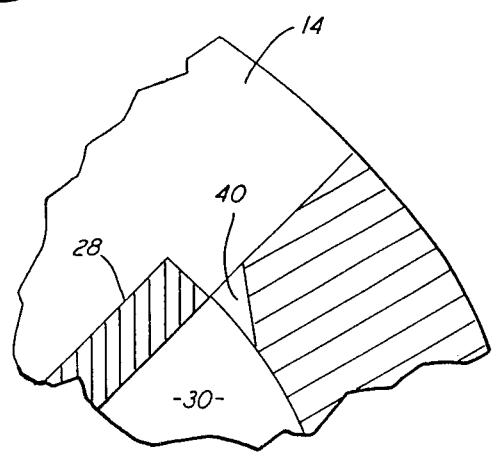
FIG. 3 is a sectional view corresponding to FIG. 2 modified according to the teachings of the present invention.

Referring now to FIG. 2, it is clear that there is an abrupt cutting off of communication between inlet 14 and chamber 30 as vane 28 passes inlet 14 in the prior art devices. FIG. 3 illustrates the effects of chamfer 40 which coacts with vane 28 to provide a restricted communication between inlet 14 and chamber 30 beyond the corresponding position of FIG. 2 which illustrates the prior art. As vane 28 passes over chamfer 40 the restricted communication between inlet 14 and chamber 30 smoothly transitions to zero with the establishment of a seal as vane 28 engages the wall of chamber 22 over its full length.

Figure 4:
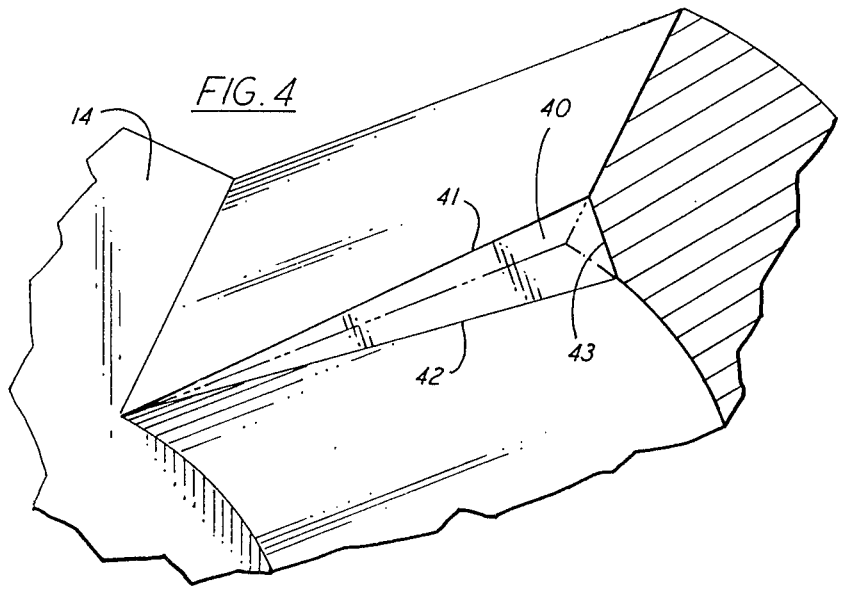
FIG. 4 is a partially sectioned pictorial view of the inlet of FIG. 3.

In FIG. 4, chamfer 40 defined by edges 41, 42 and 43 together with the phantom lines defines the material removed in forming the chamfer 40. The material removed is in the form of a tapering pyramid with an essentially right angled, triangular base. As a result, the outlet end of the restricted flow path defined by edge 42 of chamfer 40 and vane 28 moves from the full height of the pyramid towards the base with sealing taking place when vane 28 reaches the base at the intersection of edges 42 and 43 and then engages the wall of chamber 22 over its full length.

Figure 5:
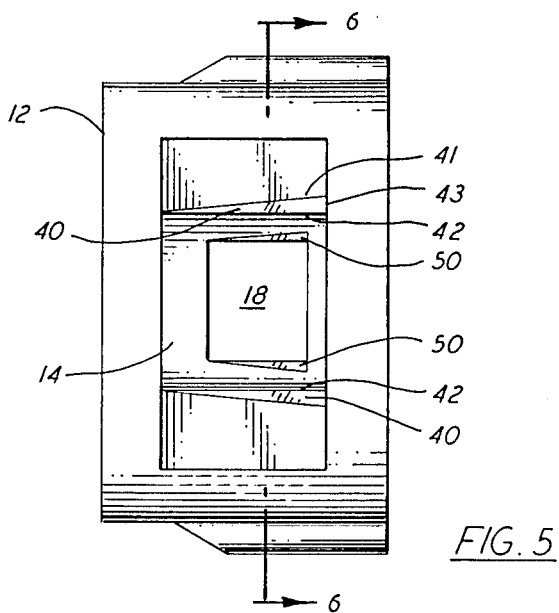
FIG. 5 is a top view looking into the inlet of the pump housing.
Figure 6:
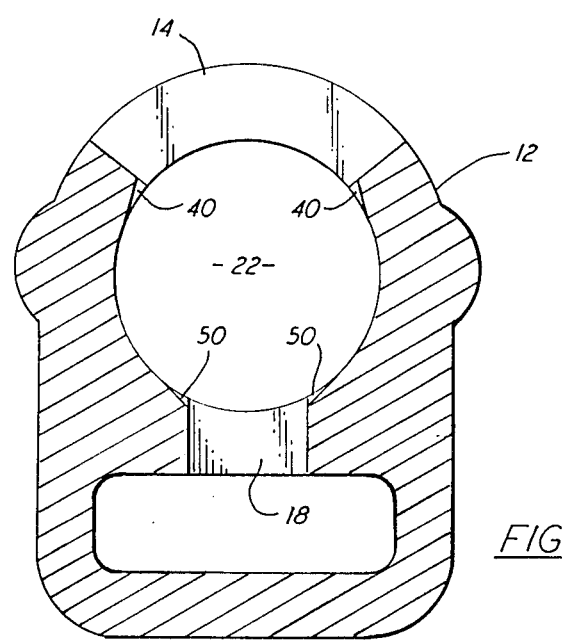
FIG. 6 is a sectional view taken along line 6—6 of FIG. 5.

FIGS. 5 and 6 illustrate the pump housing 12 of the preferred embodiment. As viewed in FIG. 5, edges 42 are parallel and edges 41 and 42 of each chamfer 40 form a nominal angle of 4° with 3°51′ being preferred. The angle represents the additional rotational movement of vane 28 to achieve full sealing. It should be noted that vanes 28 extend past the chamfers 40 as viewed in FIG. 5 otherwise they would come out of slots 27. In this embodiment, the apparent length of edge 43 is less than 0.1 inches in one device. At the location of section 6—6 illustrated in FIG. 6 the lines corresponding to edges 43 of chamfers 40 would each make an angle of approximately 15° from vertical or together, if extended, will make an angle of approximately 30°. Outlet 18 is illustrated as smaller than inlet 14 and chamfers 50, except for their location at the outlet and their reduced length, are identical with chamfers 40 and the description of chamfers 40 applies thereto. In the case of chamfers 50, they cause the establishment of communication between the pumping chamber 30 and outlet 18 about 4° of rotation earlier than when vane 28 reaches outlet 18. The size of outlet 18 and chamfers 50 can be the same as inlet 14 and chamfers 40, respectively, or any other convient size requred by a specific intended use. If outlet 18 is smaller than inlet 14, then the outlet may be tapered in addition to providing chamfers 50 to additionally smooth the transition.

Compared with the FIG. 2 configuration, the presence of a single inlet chamfer 40 on the downstream side of the inlet, as determined by the direction of rotation of rotor 26, reduced the sound power level by about 8 dBa. Providing both an inlet chamfer 40 and an outlet chamfer 50 reduced the sound power level by about 9 dBa. Providing chamfers 40 on both sides of the inlet produced an improvement of about 0.5 dBa over a single chamfer 40.

Although the present invention has been described in terms of chamfers formed at the inlet and outlet, similar results can be achieved by modifying the vane alone or in combination with the chamfers. For example, the vanes can be canted rather than extending radially from the rotor such that there is gradual closing of the inlet and opening of the outlet. Also, the angle of rotation defined by the chamfers can be changed. The tips of the vanes, sizes of the inlet and outlet, and the number of vanes may also be modified. It is, therefore, intended that the present invention is to be limited only by the scope of the appended claims.

What is claimed is:

1. A method of operating a rotary vane device having a single inlet and a single outlet at a reduced noise level wherein a rotor rotates within a chamber and carries a plurality of spaced vanes sequentially sweeping past the inlet and outlet with adjacent vanes together with the wall of the chamber defining a trapped volume which is delivered to the outlet including the step of:
    continuing and smoothly transitioning to zero the communication between the inlet and the trapped volume over approximately 4° of rotation of the rotor beyond when the vanes start to move past the inlet by use of a beveled chamfer whereby pressure pulsations and their resultant noise are reduced.

2. The method of claim 1 further including the step of:
    establishing communication between the trapped volume and the outlet before the vanes start to move into the outlet whereby pressure pulsations and their resultant noise are reduced.

3. The method of claim 2 wherein the establishing of communication between the trapped volume and the outlet takes place over approximately 4° of rotation of the rotor.

4. A method of operating a rotary vane device having a single inlet and single outlet wherein a rotor rotates within a chamber and carries a plurality of spaced vanes sequentially sweeping past the inlet and outlet with adjacent vanes together with the wall of the chamber defining a trapped volume which is delivered to the outlet including the steps of:
    continuing and smoothly transitioning to zero the communication between the inlet and the trapped volume beyond when the vanes start to move past the inlet by use of a beveled chamfer; and
    establishing communication between the trapped volume and the outlet during the period of continuing communication between the inlet and the trapped volume whereby pressure pulsations and their resultant noise are reduced.

5. A rotary vane device including a housing having a generally cylindrical chamber with a single inlet and a single outlet in fluid communication therewith, a rotor having a plurality of spaced vanes and rotatable within said cylindrical chamber such that said vanes sequentially sweep past said inlet and said outlet with adjacent vanes together with said rotor and said cylindrical chamber defining a trapped volume which is delivered to said outlet, the improvement comprising:
    first restricted fluid path defining means including a beveled chamfer between said inlet and said cylindrical chamber for providing continued, restricted fluid communication between said inlet and said trapped volume beyond a point where the vane defining the downstream end of said trapped volume starts to sweep past said inlet and which smoothly transitions to zero to thereby reduce pressure pulsations and their resultant noise.

6. The device of claim 5 wherein said chamfer extends for approximately 4° of rotation of said rotor beyond said inlet.

7. The device of claim 5 further including a second restricted fluid path defining means for providing continued, restricted fluid communication between said trapped volume and said outlet prior to a point where said vane defining the upstream end of said trapped volume starts to move into said outlet.

8. The device of claim 7 wherein said second restricted fluid path defining means includes a beveled chamfer between said cylindrical chamber and said outlet.

9. The device of claim 8 wherein said chamfer between said cylindrical chamber and said outlet extends for approximately 4° of rotation of said rotor ahead of said outlet.

10. The device of claim 7 wherein said trapped volume is in restricted fluid communication with both said inlet and said outlet simultaneously via said first and second restricted fluid paths, respectively.

* * * * *